(12) United States Patent
Bauer et al.

(10) Patent No.: US 7,113,478 B2
(45) Date of Patent: Sep. 26, 2006

(54) RADIO TELECOMMUNICATIONS SYSTEM WITH IMPROVED USE OF AIR INTERFACE (II)

(75) Inventors: Norbert Alfred Bauer, Bayem (DE); Andrea Giustina, Swindon (GB); Martine Madelaine Herpers, Herzogenaurach (DE)

(73) Assignee: Lucent Technologies Inc., Murray Hill, NJ (US)

( * ) Notice: Subject to any disclaimer, the term of this patent is extended or adjusted under 35 U.S.C. 154(b) by 751 days.

(21) Appl. No.: 09/796,854

(22) Filed: Mar. 1, 2001

(65) Prior Publication Data
US 2001/0036155 A1    Nov. 1, 2001

(30) Foreign Application Priority Data
Mar. 7, 2000   (EP) .................................. 00301875

(51) Int. Cl.
*H04L 12/26*   (2006.01)
(52) U.S. Cl. ........................................ 370/235; 370/477
(58) Field of Classification Search ................ 870/230, 870/231, 232, 235, 235.1, 236, 328, 493, 870/496
See application file for complete search history.

(56) References Cited

U.S. PATENT DOCUMENTS

| 5,455,826 | A |   | 10/1995 | Ozveren et al. |
| 5,570,360 | A |   | 10/1996 | Klausmeier et al. |
| 5,796,719 | A |   | 8/1998 | Peris et al. ................. 370/231 |
| 6,236,656 | B1 | * | 5/2001 | Westerberg et al. ..... 370/395.4 |
| 6,512,756 | B1 | * | 1/2003 | Mustajarvi et al. ......... 370/341 |
| 6,574,201 | B1 | * | 6/2003 | Kreppel ...................... 370/328 |
| 6,578,082 | B1 | * | 6/2003 | Ho et al. ..................... 370/230 |
| 6,594,241 | B1 | * | 7/2003 | Malmlof ..................... 370/329 |
| 6,728,208 | B1 | * | 4/2004 | Puuskari .................. 370/230.1 |
| 6,937,566 | B1 | * | 8/2005 | Forslow ...................... 370/231 |
| 6,947,383 | B1 | * | 9/2005 | Bauer et al. ................ 370/235 |
| 2001/0036194 | A1 | * | 11/2001 | Bauer et al. ................ 370/412 |

FOREIGN PATENT DOCUMENTS

| EP | 0 647 081 A2 | 9/1994 |
| EP | 0 814 584 A2 | 5/1997 |
| WO | WO99/05828 | 2/1999 |

OTHER PUBLICATIONS

European Search Report dated Aug. 11, 2000.

* cited by examiner

*Primary Examiner*—Chi Pham
*Assistant Examiner*—Anh-Vu Ly

(57) ABSTRACT

In a General Packet Radio Service (GPRS) system in which a Serving GPRS Support Node operates a leaky bucket algorithm to control data flow, a packet control unit in the base station is arranged so that on connection of a new mobile, a flow control message in the form of new values of B the maximum bucket capacity and R the leak rate is sent to the Serving GPRS Support Node only when it is known that the new connection is non-bursty. In the Temporary Block Flow queue for the new connection, a threshold is set at a queue length which ensures that at least two Logical Link Layer-Protocol Data Units are received before the threshold is reached. New values of B and R are then sent, the new value of B being related to the maximum data capacity of the newly connected mobile.

6 Claims, 2 Drawing Sheets

RADIO TELECOMMUNICATIONS SYSTEM WITH IMPROVED USE OF AIR INTERFACE (II)

CROSS-REFERENCE TO RELATED APPLICATION

This application claims priority of European Patent Application No. 00301875.1, which was filed on Mar. 7, 2000.

FIELD OF THE INVENTION

This invention relates to a packet-based telecommunications system, such as the General Packet Radio Service (GPRS) of the Global System for Mobile Communications (GSM) or a packet-based internet service having improved traffic control.

DESCRIPTION OF THE RELATED ART

In a known packet-based system, a practical problem is that the Packet Control Unit (PCU) can only react on demand to packets received, and is not aware of traffic it will receive in future. The question is how to allocate resources on the air interface which carries GSM voice calls, control links, and timeslots. In current systems, the bit rate, the priority and the delay applied to each GPRS connection can be varied, but this requires considerable computing and messaging resources between the Mobile Station (MS) and the Base Transceiver Station (BTS), between the BTS and the PCU, and between the PCU and the Serving GPRS Support Node (SGSN).

Each cell of the system will have associated with it a number of mobile systems; two requirements are to avoid a single mobile in a cell taking all available resources, and to avoid sending to a mobile more data or a higher bit rate than it can receive.

One method of achieving this would be to send one packet to a mobile then stop, i.e., not to apply any flow control. However since a single mobile can be capable of taking up to four timeslots, such an arrangement is inefficient.

A further practical issue of wasted resource is that of bursty transmissions; each new transmission requests a Temporary Block Flow (TBF) queue to be set up in the Radio Link Control/Medium Access Control (RLC/MAC) blocks scheduler in the PCU. A flow control message is generated by the PCU's MS flow control processor, but when a message is bursty and the TBF queue is short, such a request message is a waste of resource.

A more efficient control of passage of data to all active mobiles within a cell without increasing the computing and signaling load on the network elements or the MS is desired.

According to the invention, in a packet based telecommunications system having a serving node, a base station, first data transmission means between the base station and a plurality of users, and second data transmission means between the base station and the serving node, where for a new user over the first data transmission means, the base station is arranged to send a flow control message to a serving node only after the connection of the new user is known to be non-bursty.

Figure 1:
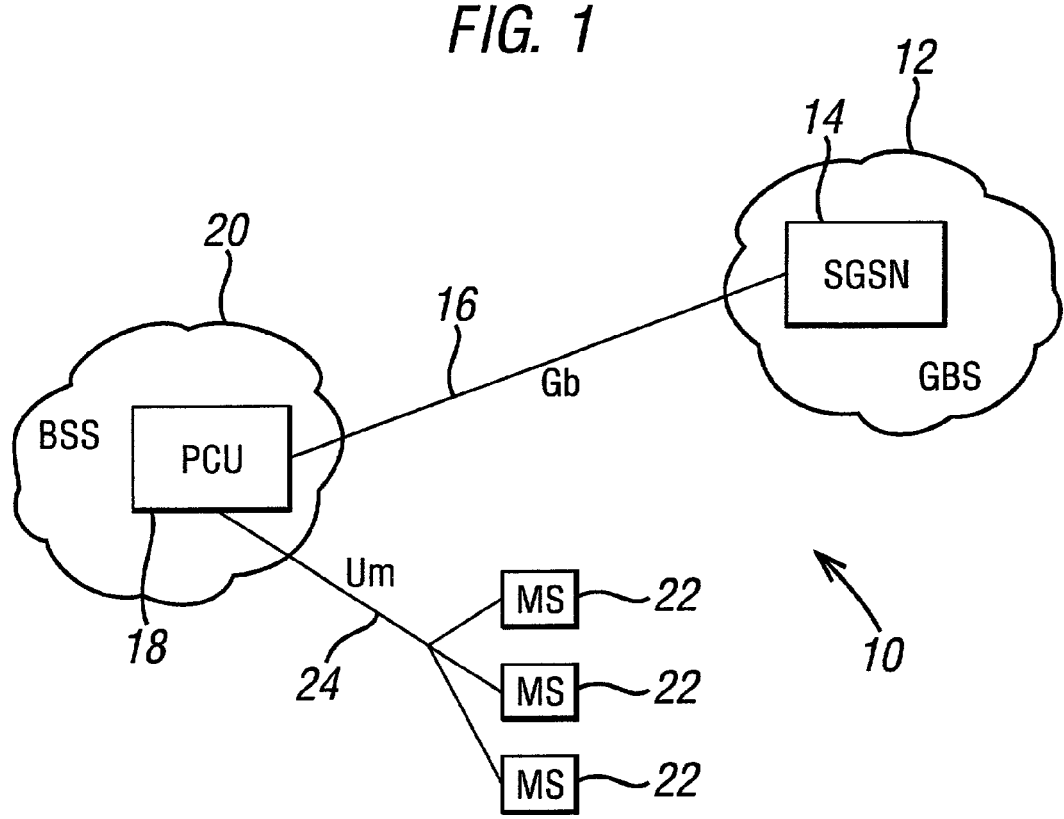
Figure 2:
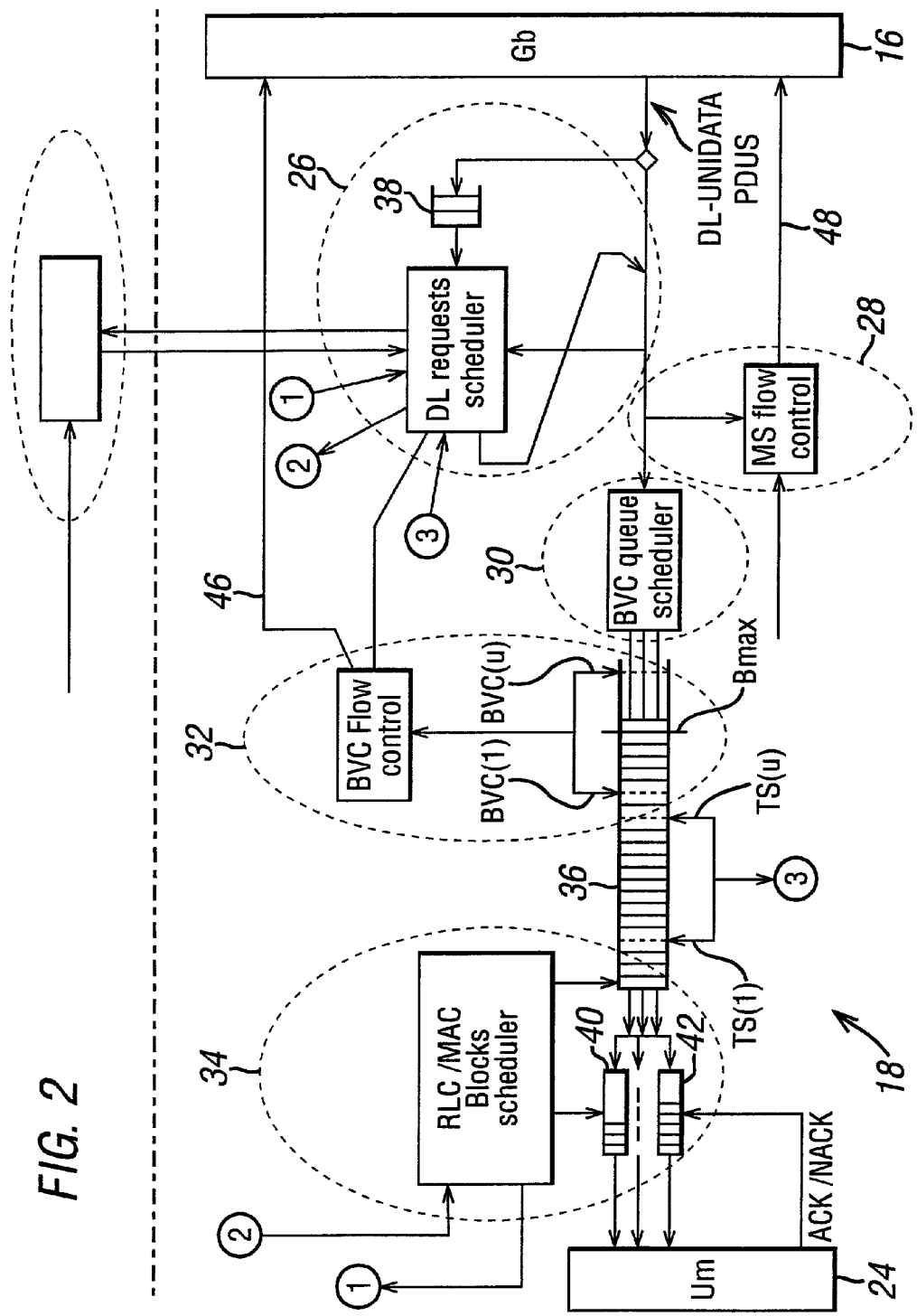

The features and advantages of the present invention will become more apparent from the detailed description set forth below when taken in conjunction with the drawings wherein FIG. 1 is a schematic illustration of the BSS part of the GPRS radio telecommunications system; and FIG. 2 is a schematic illustration of the packet control unit of a radio telecommunications system.

DETAILED DESCRIPTION

In FIG. 1 a General Packet Radio Service (GPRS) system 10 comprises a GPRS Backbone System (GBS) 12 containing a Serving GPRS Node (SGSN) 14 which is connected by an interface link Gb 16 to a Packet Control Unit (PCU) 18 within a Base Station System (BSS) 20. The PCU 18 is connected to a number of Mobile Systems (MS) 22 through an interface link Um 24.

In FIG. 2 the PCU 18, the link Gb 16, and the link Um 24 are shown. Between the links 16 and 24 there is a Down Link (DL) requests scheduler 26, a MS flow control unit 28, a Base Station System Virtual Connection (BVC) queue scheduler 30; a BVC flow controller 32, and a Radio Link Control/Medium Access Control (RLC/MAC) blocks scheduler 34.

Although the uplink is not illustrated as it is not actively involved in application of the present invention, it will naturally exist.

In normal operation at normal traffic flow rates, a new call to a MS 22 is received over the Gb link 16, and the first Protocol Data Unit DL-UNITDATA PDU passes to the queue 38 of the DL requests scheduler 26. The scheduler 26 instructs the RLC/MAC blocks scheduler 34 to allocate capacity, and a Temporary Block Flow (TBF) queue, such as queue 42, is set up for the called mobile. Signals pass over the Um link 24 to the called mobile, which returns acknowledgement signals, ACK, over link 24 to the queue 42. The scheduler 34 fetches the next DL-UNITDATA PDU which, because the MS is now known, passes through the BVC queue scheduler 30 into the BVC queue 36, and then to the appropriate TBF queue, queue 42 in this example.

The scheduler 26 assigns logical resources to one of the TBF queues 40, 42, and instructs the RLC/MAC block scheduler, message (2)—(2). The processor 28 reads from the second DL-UNITDATA PDU the multi slot capacity of the mobile.

One TBF queue is allocated to each active MS. Every MS with an active TBF queue has two logical queues; one is for Logical Link Layer (LLC) data PDUs, and one is for LLC signaling PDUs. The length of the BVC queue 36 is the sum of all the MS queues including LLC data and signaling.

The BVC queue 36 is provided towards its output end with two timeslot triggers TS(l) and TS(u) which function in the conventional way, that is, if the queue 36 exceeds the upper timeslot trigger TS(u), the DL requests scheduler 36 sends a request via interface Gb 16 to the SGSN 14 for an additional timeslot to be allocated. If an additional timeslot is allocated, the queue shortens as traffic throughput is increased, and the queue length falls below the upper trigger TS(u). The signal from the queue 36 to the scheduler 26 is indicated as message (3)—(3).

In the arrangement of FIG. 2, the major components illustrated perform their conventional functions as follows:

The DL requests scheduler 26 allocates resources, i.e. it decides which is the next MS 22 to be connected over the link 24; it requests additional timeslots when the timeslot trigger TS(u) is activated on connection (3)—(3), and it returns timeslots when they are no longer required.

The RLC/MAC blocks scheduler 34 allocates capacity, i.e. it allocates timeslots in response to instructions from the DL scheduler 36, message (2)—(2); it fetches the next DL PDU when the TBF queue 40, 42 for that MS is below a predetermined threshold (precedence is given to LLC signaling PDUs). The scheduler 34 also divides the LLC PDU into blocks, sets up transmission windows and retransmissions of blocks for each TBF queue 40, 42, and drops the TBF after a predetermined number of resent transmissions; on terminations of a call it also signals the end of a TBF queue to the DL scheduler 36, message (1)—(1).

The DL requests scheduler 26 and the RLC/MAC blocks scheduler 34 are related as follows; the scheduler 26 assigns logical resources to each TBF queue 40, 42 on a per timeslot basis, i.e. an allocation table is set up, while the scheduler 34 dynamically maps these logical resources to physical resources. Looked at another way, the scheduler 26 decides which mobile 22 will next be connected, and the scheduler 34 decides which block of information is sent to which mobile.

The BVC queue scheduler 30 selects the appropriate queue for a mobile system. It directs each DL-UNITDATA PDU to that queue. Each MS queue is divided into an MS data queue and an MS signaling queue—conveniently via use of two pointers in a common buffer.

Data flow over the Gb link 16 is controlled by use of the leaky bucket algorithm run within the SGSN 14 (FIG. 1). Values of $B_{max}$, the maximum bucket capacity and R the leak rate, are calculated by both the BVC flow control processor 32 and the MS flow control processor 28 in different circumstances, and the values sent over the Gb link 16.

The following assumptions are made about the SGSN 14;

1. The MS flow control values sent to the SGSN by the MS flow control processor 28 are valid until the SGSN 14 receives a new valid MS flow control message or until the hysteresis timer Th expires. The PCU 18 knows the timer value which the SGSN is using, and is arranged to send a new MS flow control message every Th seconds less a short tolerance time.

2. If the SGSN 14 has not received an MS flow control message for a particular MS, the SGSN uses the default flow control values as sent in every BVC flow control message. The SGSN never uses internally generated MS flow control values, when these initial values are sent in the BVC flow control message.

3. The SGSN 14 sends the MS Radio Access Capability (a class mark) in each DL-UNITDATA PDU.

4. The SGSN 14 keeps (logical) separated queues for both MS flow control and BVC flow control.

In conventional arrangements, the MS flow control processor 28 sends a flow control message over the Gb link 16 to the SGSN 14 at the beginning of every transmission. The message consists of a value of B, the maximum bucket capacity, and R the leak rate, for application by the SGSN 14 to the leaky bucket algorithm run in the SGSN in accordance with the mobiles 22 controlled by the PCU 18 at that time.

The conventional arrangements are based on "best effort" plus service precedence requirements and there is no relationship between the MS flow control values applied by the processor 28 and the requested peak bit rate. The PCU 18 reacts to an increase in the bit rate received from the SGSN 14 by allocating new resources to a TBF 40, 42.

Also, the PCU 18 sends an MS flow control message at the end of every TBF, the second message containing the MS default value; thus two MS flow control messages are sent for every transaction, whether it is bursty or not.

Turning now to detailed consideration of the invention, the MS flow control processor 28 is now provided with a threshold value which is set to distinguish between bursty and non-bursty transmission. If the amount of data received in the TBF queue is insufficient to trigger this value, then no MS flow control message is sent with new values of B or R.

The threshold is set so that sufficient data is received to include at least two Logical Link Layer Protocol Data Units (LLC-PDU). This is achieved by setting appropriate values of the default value of B, sent by the processor 28 to the SGSN 14, together with a default value of R. The SGSN operates the leaky bucket algorithm with these values until it receives update values from the processor 28.

Suppose a new connection is requested; a new TBF queue such as 40, 42 is set up, and the queue reaches a trigger length; this is also equivalent to the newly-connected mobile 22 receiving more than one packet in a stream, i.e., the connection is non-bursty.

The capacity of the newly-connected mobile is known from data included in the received LLC-PDU; this capacity, as explained above, can be up to four timeslots. The MS flow control processor 28 uses this potential capacity to calculate new values of B and R, and sends them over the link Gb 16 to the SGSN 14, which then operates the algorithm with the new values to accommodate the new connection, and allows it to use its full capacity. The network sets an upper limit to the number of time slots that can be allocated to a MS, eg 4 slots.

The new value of B, MS B, is related to the granularity of LLC-PDUs and not to the default R, but for higher values of R, B is increased in proportion. Using the multi slot capability and the limitation of four packet data channels for a TBF queue as the maximum value, then $$MS\ B = \text{default } B \text{ per } PDCH * \min\{4, \text{ number of } MS \text{ multi slot capability}\}$$

The new value of R, i.e., MS R, is also related to multi slot capability, and using optimal PDCH capacity;

$$MS\ R = \text{optimal } PDCH \text{ capacity} * \min\{4, \text{ number of } MS \text{ multi slot capability}\}$$

Thus, in contrast to the prior art arrangements an MS flow control message is sent by controller 28 only when the flow is known to be non-bursty. Exchange of control messages between the PCU 18 and SGSN 14 is minimized but control over each transmission is still maintained.

The threshold is set to allow for receipt of at least two LLC-PDUs of maximum size. The processor 28 monitors the LLC-PDUs for each active TBF, adds their data length, and compares the data with the threshold. The threshold is related to the default B value, and the PCU 18 ensures that an MS flow control message is sent before the SGSN 14 stops the transmission because it has reached the maximum packet value, i.e. before an LLC-PDU of maximum size could make the packet value reach the maximum.

Thus:

MS flow control trigger=default MS B−N201, where N201 is a standardised parameter.

Preferably a default value of B is set so as to include at least two LLC-PDUs in a TBF queue. Such a value avoids the risk of dropping a TBF while it still has data to send.

Since the threshold is dependent on the default value of B, the default value can be increased if a reduction in the number of flow control messages is required.

The life time of a bursty TBF is between 1 and 2 seconds. The default value of R should allow at least the reception of an average LLC PDU length every second; default R=average LLC PDU length*8.

An overall result of application of the invention is that the MS flow control processor 28 never reacts to a change in the actual bit rate of a TBF due to retransmissions for a particular mobile.

While this invention has been particularly shown and described with reference to a preferred embodiment thereof, it will be understood by those skilled in the art that various changes and modifications in form and details may be made without departing from the scope and spirit of the invention as defined in the appended claims. Accordingly, it is intended that the appended claims cover any such modifications or embodiments that fall within the scope of the invention.

The invention claimed is:

1. A packet based telecommunications system comprising a base station, a first data transmission means between the base station and a plurality of users, and a second data transmission means between the base station and a serving node, the serving node using a leaky bucket algorithm to control data flow, and the base station being arranged to determine if data traffic of a new user is bursty or non-bursty when said new user is connected over the first transmission means, wherein, for data traffic of a user determined to be non-bursty, at least one flow control message is sent to the serving node to set parameters of the leaky bucket algorithm in dependence on data characteristics of said user, and wherein, for data traffic of a user determined to be bursty, if only one packet of data is received in a stream, then no flow control message is sent to the serving node from the base station, such that said parameters are not set in dependence on data characteristics of the bursty user.

2. The system of claim 1 in which on connection of the new user a temporary block flow queue for that user is set up, and a threshold length is set, and when the queue reaches the threshold, the flow control message is sent.

3. The system of claim 2 in which the flow control message specifies bucket size B and leak rate R values related to the maximum data capacity of the new user.

4. The system of claim 3 in which the system is a GPRS system, and the values of B and R are independent of the actual throughput of the air interface Um.

5. The system of claim 4 in which the threshold length is set so that the temporary block flow queue receives at least two logical link layer protocol data units before the threshold is reached and a mobile station (MS) flow control message is sent.

6. The system of claim 1 wherein a user is determined to be non-bursty if more than one packet of data is received in a stream at the base station on connection of said user.

* * * * *